United States Patent
Myron et al.

(10) Patent No.: US 10,846,206 B2
(45) Date of Patent: Nov. 24, 2020

(54) ADAPTIVE SOFTWARE TESTING

(71) Applicant: T-Mobile USA, Inc., Bellevue, WA (US)

(72) Inventors: Peter P. Myron, Renton, WA (US); Michael J. Mitchell, North Bend, WA (US); Samson Kim-Sun Kwong, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 184 days.

(21) Appl. No.: 15/622,851

(22) Filed: Jun. 14, 2017

(65) Prior Publication Data

US 2018/0365132 A1 Dec. 20, 2018

(51) Int. Cl.
  *G06F 11/36* (2006.01)
(52) U.S. Cl.
  CPC ...... *G06F 11/3684* (2013.01); *G06F 11/3664* (2013.01); *G06F 11/3688* (2013.01)
(58) Field of Classification Search
  CPC ............................................. G06F 11/36–3696
  See application file for complete search history.

(56) References Cited

U.S. PATENT DOCUMENTS

| 2009/0217302 A1* | 8/2009 | Grechanik | ............... G06F 8/70 719/320 |
| 2015/0370694 A1* | 12/2015 | Zhang | ................ G06F 11/3688 717/124 |
| 2016/0103761 A1* | 4/2016 | Jain | ..................... G06F 11/3664 717/125 |

OTHER PUBLICATIONS

She, Sakura, Sasindran Sivapalan, and Ian Warren. "Hermes: A tool for testing mobile device applications." 2009 Australian Software Engineering Conference. IEEE, 2009. (Year: 2009).*
Pham, Hung, et al. "Toward Mining Visual Log of Software." arXiv preprint arXiv:1610.08911 (2016). (Year: 2016).*
Feng, Li, and Sheng Zhuang. "Action-driven automation test framework for graphical user interface (GUI) software testing." 2007 IEEE Autotestcon. IEEE, 2007. (Year: 2007).*

* cited by examiner

*Primary Examiner* — Doon Y Chow
*Assistant Examiner* — Joanne G Macasiano
(74) *Attorney, Agent, or Firm* — Lee & Hayes, P.C.

(57) ABSTRACT

In a software testing environment, a test script may be designed to search among outputs of an in-test target application for an expected output element having a specified property. A test execution engine executes the test script, and if such an output is not found, and the test script returns a "fail" result, the test execution engine revises the test script so that rather than searching for the originally specified property, the test script searches for a different property, where the different property is a property that the expected output element was observed to have during a previous execution of the test script. The test execution engine then executes the revised test script and reports its results.

20 Claims, 3 Drawing Sheets

ADAPTIVE SOFTWARE TESTING

BACKGROUND

Testing is an important part of software development. In many environments, software testing is performed automatically, using test scripts. A test script is a sequence of instructions and/or specifications that exercise a target application, typically by providing inputs and verifying that the corresponding outputs are as expected. For example, a test script may simulate user input of selecting a menu item, and then verify that a particular screen or window is displayed.

A test script typically implements one or more test cases. A test case specifies inputs to be provided to the target application and any expected outputs. A test case may also specify the conditions under which the application is to be tested.

In some environments, a test script can be created automatically by a system that records inputs of a human tester and corresponding outputs of the target application, and then replicates those inputs and checks for the recorded outputs.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
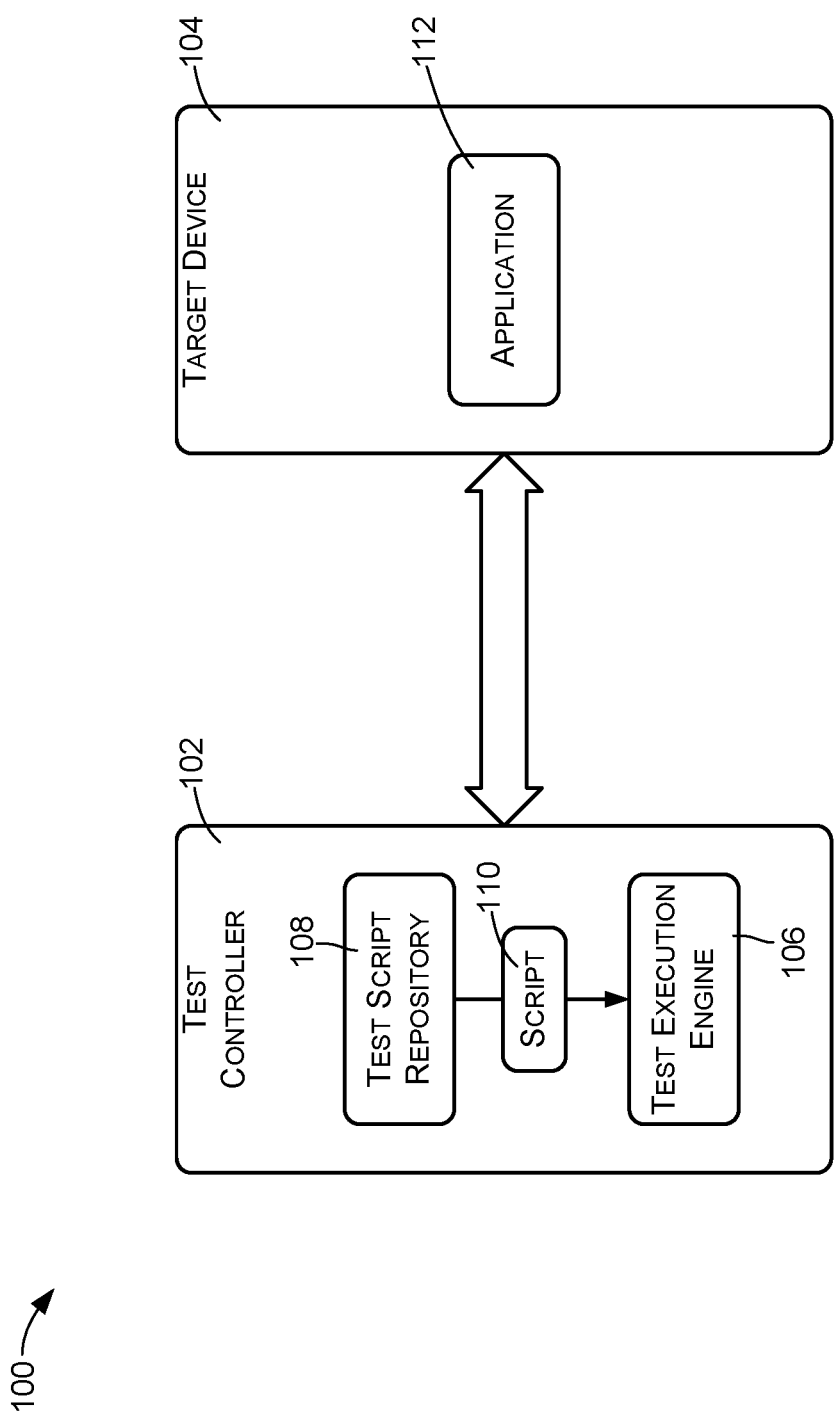
FIG. 1 is a block diagram of an example configuration for testing software.

The described implementations provide devices, systems, and methods for automated testing of applications and other software.

Although test scripts used in automated testing can be comprehensive, they may also be rigid because they lack the understanding of a human tester. Because of this, small, inconsequential changes in application outputs can generate test failures. As an example, a test script may be written to verify that a certain output element has been generated at a particular display position. Depending on how the test script was written, a minor change in the position of the output element may generate an error. A developer may then need to investigate the error, and possibly rewrite the test script to accommodate the new position of the output element. There are other types of changes that may produce similarly needless errors, such as changes in the names of active controls, changes in content, changes in colors of displayed elements, and so forth.

The problem can be exacerbated when test scripts are created automatically by recording user inputs and resulting application outputs. When a test script is created in this way, the test script might be configured so that it identifies elements based on properties that are not critical to operation of the application, and which may result in invalid test failures when those properties change because of application updates.

In described embodiments, a test execution engine obtains a test script, which implements at least one test case from a script repository. The test execution engine executes the test script against a target software application that has been deployed to a target device. The test execution engine is configured to analyze test case failures to determine whether they may be caused by inconsequential output changes, and to dynamically modify and adapt the test script to accommodate these types of changes so that they do not produce errors.

A test script for a particular test case is written to provide one or more inputs to the application and to then attempt to find an expected output element, such as a window, a pane, a button, an input field, output data, a check box, a menu, etc. The expected output element may be defined in terms of one or more expected properties of the element, and the test script may be written to attempt to find an output element having one or more of those properties. For example, the test script may be written to look for a control having a specified name as a property. Expected properties may include things such as the name of an output element, the position on a display of the output element, expected content of the output element, an index or other programmatic identifier of an output element, etc.

As a test script is repeatedly and successfully executed, the test execution engine records properties of expected output elements that have been specified by the test script and found in the output of the target application. Recorded properties of an output element may include a property that the test script specifies to identify the output element, as well as additional properties of the output element that have not been specified by the test script. For example, while a test script may be designed to look for a control having a particular name, the test execution engine may also record the position of the control.

When a test script fails to find an expected output element, the test execution engine revises the test script so that in the future the test script will search for other output elements, based on the previously recorded properties of the expected output element. More specifically, the test script is modified so that rather than looking for an output element having the originally specified property, the test script attempts to find an output element having one or more of the additional properties that have previously been recorded for the expected output element.

The test execution engine then executes the revised test script, which in some cases may now find the expected output element based on a new property that has been specified for the expected output element. Thus, the test case may be reported as passing, in spite of a change in the output of the application.

In some cases, a test script may indicate whether the property used to specify an output element is a critical property or merely an identifying property. When an originally specified property is a critical property of the expected output, the test execution engine does not revise the test script in response to a test case failure.

FIG. 1 shows an example test environment 100 having a test controller 102 and a target device 104. The test controller 102 may comprise a computer, a computer server or some other type of computerized equipment. The target device 104 may comprise any type of device or equipment upon which an application or other software will be tested. Examples of such devices include computers, cellular communications handsets, smartphones, industrial control devices, home automation devices, wearable devices, and any other components having computing capabilities.

In the embodiment of FIG. 1, the test controller 102 communicates with the target device 104 through a USB (Universal Serial Bus) interface. In other embodiments, the test controller 102 may communicate with the target device 104 over a local-area or wide-area network or other communication channel. In some cases, the test controller 102 may access a logical instrumentation interface or API (Application Programming Interface) of the target device 104 in order to perform testing. In an example case where the target device 104 comprises an Android® device the test controller 102 may access the ADB (Android Debug Bridge) interface of the target Android device. An instrumentation interface such as ADB allows use of a command/query language and syntax to interact with the target device, and allows control of the device for development and testing.

The test controller 102 has a test execution engine 106 and a test script repository 108 that stores multiple test scripts 110. Each of the test scripts 110 specifies a sequence of operations to be performed with respect to the target device 104. Operations may include loading and initiating applications, simulating user input, receiving or detecting user interface output, evaluating system resources or other resources being used by the device or an application executing on the device, and so forth.

The test execution engine 106 is a software application or component that executes a test script 110 from the test script repository 108 against the target device 104. The test script 110 may contain instructions for configuring the target device 104, for installing and initiating an application 112 on the target device 104, for providing simulated user input or other input to the application 112, and for verifying that the application 112 produces expected output in response to the input.

The test script 110 may implement one or more test cases. For purposes of this discussion, a test case is said to fail when the test script fails to find expected output of the test case.

Although the test controller of FIG. 1 is shown and described as being a discrete device or component for purposes of discussion, it may in practice comprise one or more physical, virtual, or otherwise abstracted cluster or network of machines and/or devices. Accordingly, the term "test controller" is intended to reference any one or more computing devices, including physical devices and virtual computing units, and including network-based devices that are commonly referred to as being in the cloud.

Figure 2:
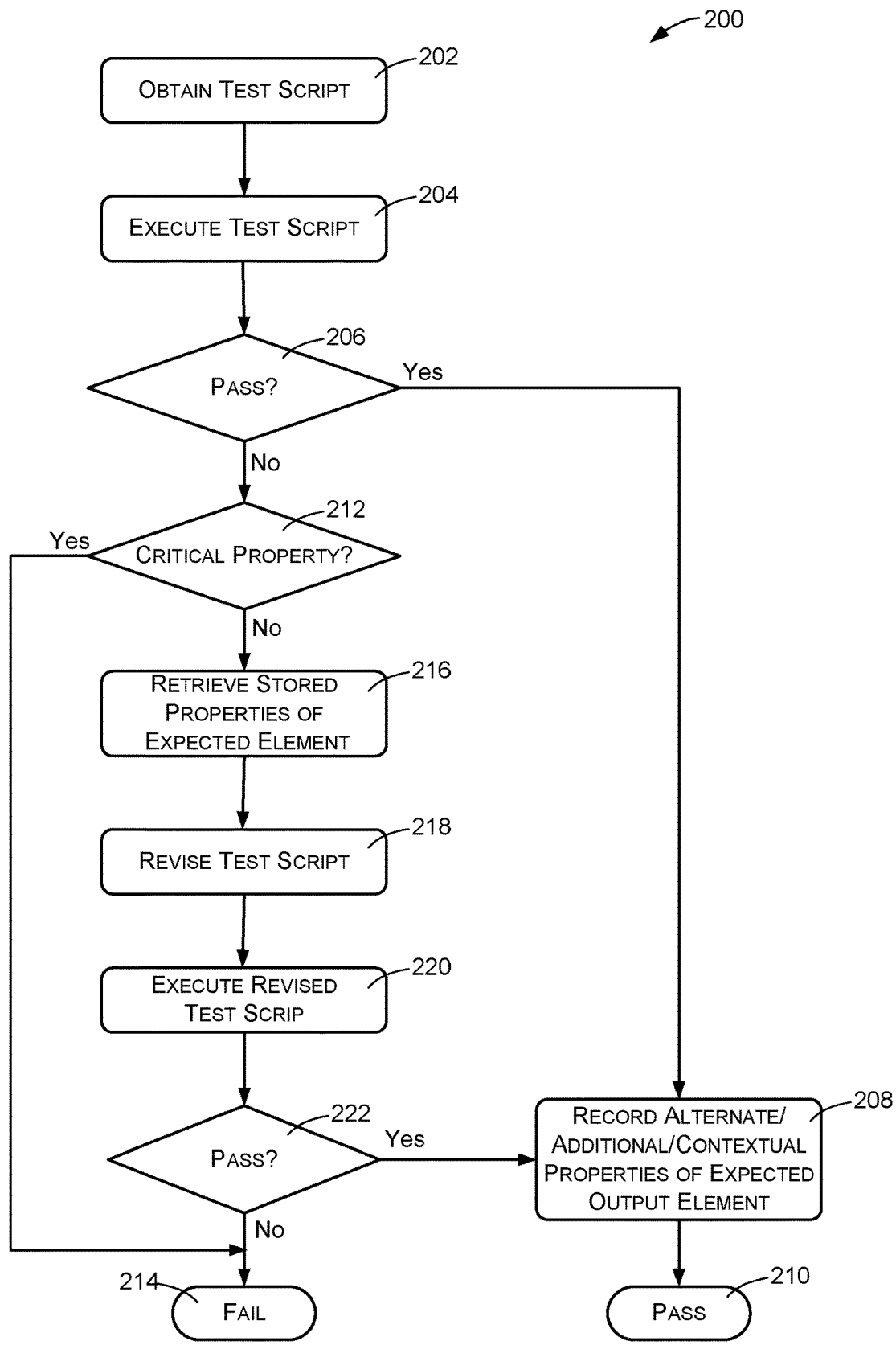
FIG. 2 is a flow diagram illustrating an example method of software testing.

FIG. 2 illustrates an example method 200 for automated and adaptive testing of software and devices. The method 200 may be used to test applications, including various types of code modules and other software, and including software that supports a target device such as operating system software. In the discussion below, it is assumed that the method 200 is performed by the test execution engine 106. However, the described actions can be performed by various types of computerized devices and/or executable components.

An action 202 comprises obtaining a test script, such as obtaining the test script 110 from the test script repository 108. The test script can be written in any of various available programming languages, and may correspond to one or more test cases. Generally, for a particular test case, the test script is designed to (a) simulate user input or other input to a target application, such as the target application 112 of FIG. 1, and (b) attempt to find one or more expected output elements among the various output elements that the application produces in response to the simulated user input, which are referred to herein as application output elements.

An output element may comprise any of many different types of elements, including screens, icons, windows, menus, graphics, controls, buttons, indicators, input fields, output fields, data, text, and so forth, as examples. In some cases, the application may generate a user interface, and the test script may be designed to look for expected output elements of the user interface such as visible controls, graphics, etc. However, output elements are not limited to displayed user interface elements, and may include different types of elements such as states or conditions of the target device. As another example, an output element may comprise a log file or an entry of a log file. In some situations, an output element may comprise an element that is outside of the target device 104, such as a data element, state, or other indicator that is produced by or stored on a server, a database, or some other external entity.

The test script may define an expected output element of a test case in terms of one or more properties of the expected output element. As an example, a display element such as an input field may have an associated name, and the test script may be configured to find the input field by finding a control with that name. As another example, an input field may be expected at a particular position within a user interface, and the test script may be configured to find the input field by confirming that there is a control at the expected position. The following are non-limiting examples of output element properties that might be associated with a user interface element:

a name of the interface element;
an identifier of the interface element;
a title of the interface element;
content of the interface element;
a size of the interface element;
a set of dimensions of the interface element;
an output value of the interface element;
a color of the interface element;
text presented by the interface element;
help text presented by the interface element;
possible user selections that are available in the interface element;
a type of the interface element;
an icon presented by the interface element;
a menu presented by the interface element;
a context menu presented by the interface element;
a graphics element presented by the interface element;
a control presented by interface element;
a default input value of the interface element;
a resource associated with the interface element;
a hyperlink presented by the interface element;
etc.

An action 204 comprises executing the test script against the target application, which causes the target application to produce one or more application output elements. The action 204 may be performed by communicating with an instrumentation interface of a target device, such as a USB/ADB interface of a smartphone, computer, or other computerized equipment, and issuing commands in accordance with the test script.

In this discussion, it is assumed that the application is already installed and running on the target device. However, in some cases the test script itself may cause the target device to obtain, install, and execute the application. For example, the test script may command the target device to obtain an application from an online storefront or other application market place, to install the application, and to initiate execution of the application.

In other embodiments, the application may be provided by a test server such as a server that implements continuous integration (CI) testing. In a CI environment, an application may be periodically built by a CI service and either installed on the target device by the CI system or provided to a test controller or online store for subsequent installation on the target device.

As the test script is executed in the action 204, it provides input to the application and attempts to find resulting output elements that have respectively specified properties. For purposes of discussion, it will be assumed that the test script implements an individual test case and attempts to find a corresponding expected output element having a specified expected property. This expected property will also be referred to as a first expected property in the following discussion.

As an example, the test script may try to find a displayed control having the first property, where the first property comprises a name of the control or a position of the control. Note that although the discussion assumes that the test script attempts to find a single output element for an individual test case, test scripts for other test cases may attempt to find multiple output elements. Furthermore, an expected output element may in some cases be specified as an output element having two or more specified properties. In some cases, the expected output element may exist on and be retrieved from a device or other entity other than the target device 104.

A test script is configured to generate a "pass" result if the expected output element is found and a "fail" result if the test script is unable to find the expected output element among the application output elements within a given time period or other temporal bound.

An action 206 comprises determining whether the test script returned a "pass" result for the corresponding test case. If so, an action 208 is performed. The action 208 comprises storing or otherwise recording multiple properties of the expected output element that was found by the test script. The recorded properties include properties other than the first property specified by the test script in association with the expected output element, such as alternate properties of the output element, additional properties of the output element, contextual properties of the output element, and so forth. For example, suppose that the first property, specified by the test script, is a name or identifier. When the test script returns a "pass," indicating that the expected output element was found, the test execution engine identifies and records one or more additional properties of the expected output element. Continuing the example above, additional properties may comprise the position of the expected output element and the text content that is presented within the expected output element. In some embodiments, the test execution engine may keep only those properties that were observed during the most recent execution of the test script.

The test execution engine then reports a "pass" result for the test case, as indicated by the block 210.

Referring again to the action 206, if the test script instead returns a "fail" result, indicating that the test script was unable to find the expected output element, the test execution engine continues with an action 212. The action 212 comprises determining whether the first property, specified by the test script, has been designated as a critical property of the expected output element. If the first property is a critical property, the test execution engine reports a "fail" result for the test case, as indicated by the block 214.

In some embodiments, a test script may be written in a way that indicates whether a property used to specify an expected output element is critical. That is, for each specified property, the test script may indicate whether the property itself must be present in order for the test case to pass.

Referring again to the action 212, if the first property is not a critical property, the test execution engine continues with an action 216, which comprises obtaining and/or receiving any previously stored properties of the expected output element, such as those that were previously recorded in the action 208.

An action 218, performed by the test execution engine or an associated component, comprises revising the test script based on the additional properties of the expected output element, where the additional properties are selected from those that were previously stored in the action 208 and obtained in the action 216. More specifically, the action 218 may comprise selecting or otherwise identifying a second property, which is different than the first property, from among the multiple properties that the expected output had during a previous execution of the test script. The test script is modified so that rather than attempting to locate an output element having the originally specified first property, it attempts to locate an output element having the newly selected second property, which was previously observed as a property of the expected output element.

Note that both the original test script and the revised test script may specify an expected output element by more than one property, although for purposes of explanation the discussion herein assumes that an expected output element is specified by a single property, whether specified in the original test script or the revised test script.

An action 220 is then performed of executing the revised test script against the target application. As the revised test script is executed in the action 220, the test script attempts to find an output element having the second property. If an output element such as this is found, it is deemed to be the expected output element, and the test script returns a "pass" result.

An action 222 comprises determining whether the test script returned a "pass" result, indicating that an output element having the second property was found. If the test script has returned a "pass" result, the action 208 is performed, which as discussed above comprises storing the additional properties of the expected output element, including properties other than those specified by the revised test script. The test execution engine then reports a "pass" result for the test case, as indicated by the block 210.

If in the action 222 it is determined that the revised test script has returned a "fail" result, indicating that an output element having the second property was not found, the test execution controller returns a "fail" result for the test case, as indicated by the block 214.

As one example, consider a case where an originally supplied test script specifies an expected output element in terms of the name or identifier of the output element. If upon execution of the test script an output element having that name is not found, the test execution revises the test script to look for an output element having a different property, where the different property is a property that the expected output element had during a previous execution of the test script. For example, the different property might be the position at which the expected output element was presented in the previous execution.

Similarly, the originally supplied test presented by the test script might specify a position, and in the case that an output element is not found at that position, the test execution engine may substitute the name of the expected control element as observed during the previous execution of the test script.

In some cases, it may be desired to provide a higher assurance that the test script does not erroneously "pass" a test case as a result of changing specified properties as described above. In these cases, the action 218 may comprise revising the test script so that it attempts to find an output element having multiple ones of the properties that the expected output element was previously observed to have. The number of matching properties that are to be present in the expected output element may be increased to reduce chances of erroneously passing a test case, and may be decreased to reduce chances of erroneously failing a test case.

Figure 3:
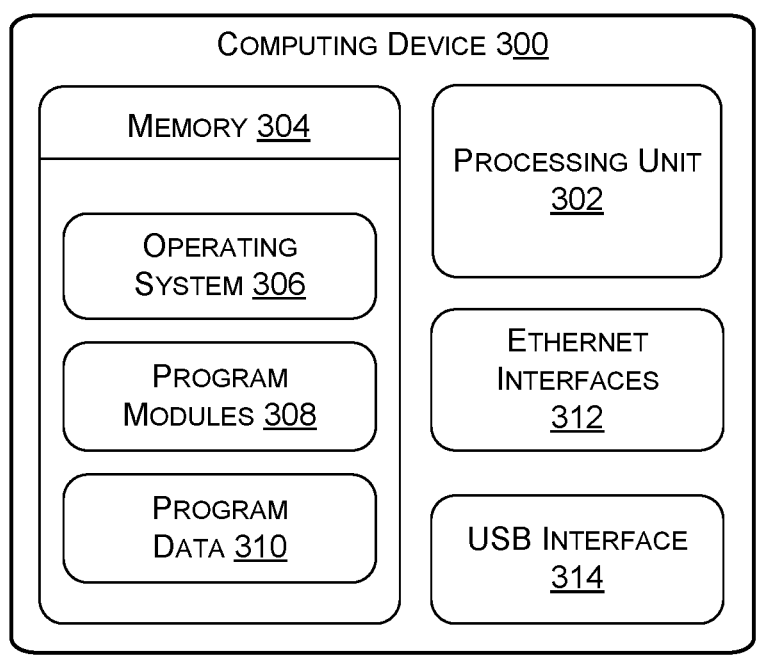
FIG. 3 is a block diagram illustrating example high-level components of a computing device, one or more of which may be used as a test controller in the environment of FIG. 1.

FIG. 3 is a block diagram of an illustrative computing device 300 such as may be used to implement the test controller 102. In some cases, the target device 104 may also comprise a computing device having components similar to those shown in FIG. 1.

In various embodiments, the computing device 300 may include at least one processing unit 302 and memory 304. The memory 304 may store an operating system 306, one or more program modules 308, and program data 310. The memory 304 may also include data storage devices (removable and/or non-removable) such as, for example, magnetic disks, optical disks, or tape.

The memory 304 may comprise non-transitory computer storage media, which may include volatile and nonvolatile, removable and non-removable media implemented in any method or technology for storage of information, such as computer readable instructions, data structures, program modules, or other data. The non-transitory computer-readable storage media may further include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 300.

In various embodiments, any or all of the memory 304 may store programming instructions which, when executed, implement some or all of the function functionality described above as being implemented by the test controller 102 and the test execution engine 106. For example, the test execution engine 106 may be stored in the memory 304 for execution by the processing unit 302. Likewise, the test script repository 108 may reside in the memory 304. Where the computing device 300 is the device being tested, the application 112 may reside in the memory 304 or execution by the processing unit 302.

The computing device 300 may have one or more Ethernet interfaces 312, which may be used for connecting to a wide-area network such as the Internet. The computing device 300 may also have one or more USB ports 314 for communicating with external devices such as the target device 104.

The computing device 300 may have various other elements such as a keyboard, a mouse, a touch-sensitive display, voice input device, etc. Output device(s) such as a display, speakers, a printer, etc. may also be included.

Although features and/or methodological acts are described above, it is to be understood that the appended claims are not necessarily limited to those features or acts. Rather, the features and acts described above are disclosed as example forms of implementing the claims.

What is claimed is:

1. A method, comprising:
   obtaining a test script for a test case, wherein the test script is configured to (a) simulate user input to a target application, resulting in one or more application output elements, and (b) attempt to find an expected output element, among the one or more application output elements, that has a first property associated with a content of the expected output element;
   executing the test script against the target application to cause the target application to produce the one or more application output elements, wherein the test script is unable to find the expected output element among the one or more application output elements;
   determining whether the first property is a critical property; and
   if the first property is not a critical property then:
      identifying a second property, associated with the content of the expected output element, that the expected output element had during a previous execution of the test script, wherein the second property is different than the first property;
      revising the test script so that a revised test script attempts to find the expected output element by identifying one of the one or more application output elements that has the second property, wherein the revised test script comprises the second property; and
      executing the revised test script against the target application, wherein the revised test script is able to find the expected output element among the one or more application output elements.

2. The method of claim 1, further comprising recording one or more additional properties, other than the first property, that the expected output element had during the previous execution of the test script, wherein the second property is one of the one or more additional properties.

3. The method of claim 1, wherein identifying the second property comprises selecting the second property from among one or more additional properties, associated with the content of the expected output element, that the expected output element had during the previous execution of the test script.

4. The method of claim 3, wherein the expected output element is a user interface element and the one or more additional properties include any one or more of the following properties associated with the content of the user interface element:
   content of the interface element;
   an output value of the interface element;
   a color of the interface element;
   text presented by the interface element;
   help text presented by the interface element;
   possible user selections that are available in the interface element;
   an icon presented by the interface element;
   a context menu presented by the interface element;
   a control presented by interface element;
   a default input value of the interface element; or
   a resource associated with the interface element.

5. The method of claim 1, wherein the second property comprises a name or programmatic identifier that the expected output element had during the previous execution of the test script.

6. The method of claim 1, wherein the second property comprises content of the expected output element during the previous execution of the test script.

7. The method of claim 1, and further comprising:
if the first property is a critical property then reporting a fail result for the test case.

8. One or more non-transitory computer-readable media storing computer-executable instructions that, when executed by one or more processors, cause the one or more processors to perform actions comprising:
obtaining a test script for a test case, wherein the test script is configured to attempt to find an expected output element, among one or more application output elements, that has a first property associated with a content of the expected output element;
executing the test script, wherein the test script is unable to find the expected output element among the one or more application output elements;
determining whether the first property is a critical property; and
if the first property is not a critical property then:
revising the test script so that it attempts to find the expected output element by identifying one of the one or more application output elements that has a second property associated with the content of the expected output element and that the content of the expected output element had during a previous execution of the test script, wherein the revised test script comprises the second property.

9. The one or more non-transitory computer-readable media of claim 8, the actions further comprising recording one or more additional properties, other than the first property, of the expected output element during the previous execution of the test script, wherein the second property is one of the one or more additional properties.

10. The one or more non-transitory computer-readable media of claim 8, wherein:
the expected output element is a user interface element;
the first property comprises a programmatic identifier of the user interface element; and
the second property comprises a name that was associated with the content of the user interface element during a previous execution of the test script.

11. The one or more non-transitory computer-readable media of claim 8, wherein the second property comprises content that the expected output element had during a previous execution of the test script.

12. The one or more non-transitory computer-readable media of claim 8, the actions further comprising selecting the second property from among one or more additional properties that the expected output element had during the previous execution of the test script.

13. The one or more non-transitory computer-readable media of claim 12, wherein the expected output element is a user interface element and the one or more additional properties include any one or more of the following properties associated with the content of the user interface element:
content of the interface element;
an output value of the interface element;
a color of the interface element;
text presented by the interface element;
help text presented by the interface element;
possible user selections that are available in the interface element;
an icon presented by the interface element;
a context menu presented by the interface element;
a control presented by interface element;
a default input value of the interface element; or
a resource associated with the interface element.

14. The one or more non-transitory computer-readable media of claim 8 wherein, if the first property is a critical property, the actions further comprise:
reporting a fail result for the test case.

15. A method, comprising:
obtaining a test script for a test case, wherein the test script is configured to (a) provide input to a target application, resulting in one or more application output elements, and (b) attempt to find an expected output element, among the one or more application output elements, that has a first property associated with a content of the expected output element;
executing the test script against the target application to cause the target application to produce the one or more application output elements, wherein the test script is unable to find the expected output element among the one or more application output elements;
determining whether the first property is a critical property; and
if the first property is not a critical property then:
determining that a particular output element, among the one or more application output elements, is the expected output element, wherein the particular output element has a second property, associated with the content of the particular output element, that is different than the first property and that the content of the expected output element had during a previous execution of the test script; and
revising the test script so that a revised test script attempts to find the expected output element by identifying one of the one or more application output elements that has the second property, wherein the revised test script comprises the second property.

16. The method of claim 15, further comprising recording one or more additional properties, other than the first property, of the expected output element during the previous execution of the test script, wherein the second property is one of the one or more additional properties.

17. The method of claim 15, further comprising selecting the second property from among multiple properties that the expected output element had during the previous execution of the test script.

18. The method of claim 15, wherein:
the first property comprises a name of the expected output element; and
the second property comprises a programmatic identifier of the expected output element.

19. The method of claim 15, further comprising executing the revised test script.

20. The method of claim 15, and further comprising:
if the first property is a critical property then reporting a fail result for the test case.

* * * * *